United States Patent
Zhang et al.

(10) Patent No.: US 11,662,466 B2
(45) Date of Patent: May 30, 2023

(54) LASER DISTANCE MEASURING DEVICE AND METHOD OF USE THEREOF

(71) Applicant: HANGZHOU OLE-SYSTEMS CO., LTD., Zhejiang (CN)

(72) Inventors: Ou Zhang, Zhejiang (CN); Yaping Zhu, Zhejiang (CN)

(73) Assignee: HANGZHOU OLE-SYSTEMS CO., LTD., Zhejiang (CN)

( * ) Notice: Subject to any disclaimer, the term of this patent is extended or adjusted under 35 U.S.C. 154(b) by 345 days.

(21) Appl. No.: 16/639,162

(22) PCT Filed: Aug. 15, 2017

(86) PCT No.: PCT/CN2017/097516
§ 371 (c)(1),
(2) Date: Feb. 14, 2020

(87) PCT Pub. No.: WO2019/033270
PCT Pub. Date: Feb. 21, 2019

(65) Prior Publication Data
US 2020/0174128 A1 Jun. 4, 2020

(30) Foreign Application Priority Data

Aug. 14, 2017 (CN) .......................... 201710693140.5

(51) Int. Cl.
*G01S 17/46* (2006.01)
*G01S 7/481* (2006.01)

(52) U.S. Cl.
CPC ............ *G01S 17/46* (2013.01); *G01S 7/4816* (2013.01)

(58) Field of Classification Search
CPC ...... G01S 17/46; G01S 7/4816; G01S 7/4863; G01S 7/4868; G01S 7/4873; G01S 7/497; G01S 7/4812; G01S 17/08; G01S 7/481
See application file for complete search history.

(56) References Cited

U.S. PATENT DOCUMENTS 9,354,317 B2    5/2016  Halmos

FOREIGN PATENT DOCUMENTS

CN    101710178 A  *  5/2010  ............ G01S 17/95
CN    101710178 B     10/2012
(Continued)

OTHER PUBLICATIONS

Translation of CN203385859U (Year: 2013).*
Translation of CN 101710178 (Year: 2009).*
(Continued)

*Primary Examiner* — Edwin C Gunberg
*Assistant Examiner* — Mamadou Faye
(74) *Attorney, Agent, or Firm* — Dentons US LLP

(57) ABSTRACT

A laser distance measuring device and a method of use thereof are described. The laser distance measuring device can include an emitting unit (4), a reflecting mirror (3), an emitting lens (2), a receiving lens (1), and a receiving unit (8); the laser distance measuring device can further include: at least one spectroscope (7) provided between the receiving lens (1) and the receiving unit (8), which is arranged successively on the same optical propagation path; at least one spectrum receiving unit (9) arranged in a one-to-one correspondence with the spectroscope (7). The technical solution has a wider measurement range and is adaptable to measured targets in different distances; a multiplicity of feedbacks and adjustments is not necessary, and the acquirement of the measurement data can be achieved in a short time, therefore the operating time is saved.

7 Claims, 2 Drawing Sheets

(56) References Cited

FOREIGN PATENT DOCUMENTS

| | | | |
|---|---|---|---|
| CN | 203385859 U | * | 1/2014 |
| CN | 104293648 A | | 1/2015 |
| CN | 206002687 U | | 3/2017 |
| CN | 206147096 U | | 5/2017 |
| CN | 206300636 U | | 7/2017 |
| JP | 11-23710 A | | 1/1999 |
| JP | 2009-8404 A | | 1/2009 |

OTHER PUBLICATIONS

International Search Report and Written Opinion dated May 8, 2018 in corresponding International Patent Application No. PCT/CN2017/097516, filed Aug. 15, 2017, 10 pages.

Office Action dated Mar. 3, 2021 in corresponding Japanese Patent Application No. 2020-508374, 3 pages.

Partial Supplementary Search Report dated Mar. 1, 2021 in corresponding European Patent Application No. 17922032.2, 15 pages.

* cited by examiner

LASER DISTANCE MEASURING DEVICE AND METHOD OF USE THEREOF

CROSS-REFERENCE TO PRIOR APPLICATIONS

This application is a National Stage of PCT/CN2017/097516, filed Aug. 15, 2017, and designating the United States of America (published on Feb. 21, 2019, as WO 2019/033270 A1), which claims priority under 35 U.S.C. § 119 to Chinese Patent Application No. 201710693140.5, filed Aug. 14, 2017, each hereby expressly incorporated by reference in its entirety and each assigned to the assignee hereof.

TECHNICAL FIELD

The present invention relates to the field of laser distance measurement, in particular to a laser distance measuring device and a method of use thereof.

BACKGROUND

Currently, in the existing technology of pulse ranging, a laser distance measuring device emits a light signal to a measured target, and the light signal is reflected thereafter. The distance between the measured target and the laser distance device might be either long or short. When the laser distance device deals with the light signal reflected from the measured target in a short distance, the energy of the light signal is so intense that photoelectric receivers, when converting the light signal into a pulse signal, tend to assume a saturated state, thereby resulting in failure in the measurement of the real distance thereof.

In the prior art, the light signal reflected from the measured target in a short distance is attenuated and continuously fed back, in such a way that the emissive power of the laser distance measuring device is adjusted gradually, until the photoelectric receivers is able to collect data within an effective measuring range, thereby achieving the measurement of the measured target in a short distance. By way of example, the work flow of a traditional laser distance measuring device is that a laser light is emitted from a laser emitting device, running through an emitting lens, and reflected back to the laser distance measuring device when encountering a measured object, then the reflected light penetrates through a receiving lens set, runs through an optical filter which filters the external stray light not emitted by the laser distance measuring device, and through a condenser lens which converts the received light into an approximately parallel light, finally a photoelectric conversion element converts the light signal into an electric signal for processing. If the electric signal converted by the photoelectric conversion element does not conform to the measurement range, the laser emitting device of the laser distance measuring device adjusts the emission power to reduce the laser energy for another test, until the electric signal converted by the photoelectric conversion element conforms to the measurement range.

However, the prior art has the following major drawbacks: it is time-consuming and of slow response, and needs several or dozens of pulses to realize an effective measurement range. The drawbacks result in that the laser distance measuring device in the prior art is not available to high-speed and high-accuracy measurements.

Thus, it is necessary to design a laser distance measuring device capable of achieving the distance measurement of the measured target in an effective measurement range without a plurality of feedbacks.

SUMMARY

In view of the aforementioned technical problems, the objective of the present invention is to provide a laser distance measuring device and a method of use thereof, which splits light signals using a spectroscope and receives and selects several light signals at the same time, so as to achieve the technical effect of quick measurement.

The present invention discloses a laser distance measuring device, comprising an emitting unit, a reflecting mirror, an emitting lens, a receiving lens, and a receiving unit. The laser distance measuring device further comprises at least one spectroscope provided between the receiving lens and the receiving unit, which is arranged successively on the same optical propagation path; at least one spectrum receiving unit arranged in a one-to-one correspondence with the spectroscope; wherein the emitting unit emits a light signal, which, after being reflected by the reflecting mirror, runs through the emitting lens, to reach a measured target; the measured target reflects the light signal to form a returning light signal, which, after running through the receiving lens, is split by the spectroscope nearest to the receiving lens into a penetrating light signal penetrating through the spectroscope and a reflected light signal reflected by the spectroscope according to a light splitting ratio; the penetrating light signal runs through the other spectroscopes successively along the optical propagation path, wherein a reflected light signal is generated when the penetrating light signal runs through each spectroscope; each reflected light signal is received by a spectrum receiving unit corresponding to the spectroscope generating the reflected light signal; the penetrating light signal, after penetrating through the spectroscope farthest from the receiving lens, is received by the receiving unit.

Preferably, the number of the spectroscopes is more than two, which constitute a light splitting array; the optical propagation path going through the spectroscopes is a straight line; when the returning light signal runs through the light splitting array, the energy of the penetrating light signal penetrating through the spectroscopes is attenuated step by step in term of the light splitting ratios of the spectroscopes.

Preferably, the laser distance measuring device comprises 3 spectroscopes and 3 spectrum receiving units; the light splitting ratio of each of the spectroscopes is 1:4.

Preferably, the light splitting ratio of the spectroscope is between 1:1 and 1.10.

Preferably, the receiving unit and the spectrum receiving units are photoelectric conversion elements, which convert the received light signals into electric signals, the magnitude of the amplitude of the electric signals reflecting that of the energy of the light signals.

Preferably, the laser distance measuring device further comprises an analyzing unit, which is connected with the receiving unit and the spectrum receiving unit, has an amplitude threshold set therein, and is used for comparing the amplitudes of the electric signals converted by the receiving unit and the spectrum receiving units with the amplitude threshold.

Preferably, the light signal emitted by the emitting unit is a pulse signal.

The present invention further discloses a method of use of a laser distance measuring device, comprising the following steps:

Step S1: controlling an emitting unit of the laser distance measuring device to emit a light signal, which, after being reflected by a reflecting mirror, running through an emitting lens, to reach a measured target;

Step S2: the measured target reflecting the light signal to form a returning light signal, and the returning light signal, after running through a receiving lens, being split by a spectroscope nearest to the receiving lens into a penetrating light signal penetrating through the spectroscope and a reflected light signal reflected by the spectroscope according to a light splitting ratio.

Step S3: the penetrating light signal running through the other spectroscopes successively along the optical propagation path, wherein a reflected light signal is generated when the penetrating light signal runs through each spectroscope.

Step S4: each reflected light signal being received and converted to an electric signal by a spectrum receiving unit corresponding to the spectroscope generating the reflected light signal.

Step S5: the penetrating light signal, after penetrating through the spectroscope farthest from the receiving lens, being received and converted to an electric signal by the receiving unit.

Step S6: the analyzing unit judging successively whether the amplitudes of the electric signals converted by the spectrum receiving units and the receiving unit are less than an amplitude threshold.

Step S7: if the amplitude of at least one of the electric signals converted by the spectrum receiving units and the receiving unit is less than the amplitude threshold, selecting the one with the greatest amplitude from the electric signals with the amplitudes less than the amplitude threshold as the measurement data.

Comparing with the prior art, the above-mentioned technical solution has the following advantages:

1. it has a wider measurement range and is adaptable to measured targets in different distances;

2. a multiplicity of feedbacks and adjustments is not necessary, and the acquirement of the measurement data can be achieved in a short time, therefore the operating time is saved.

Figure 1:
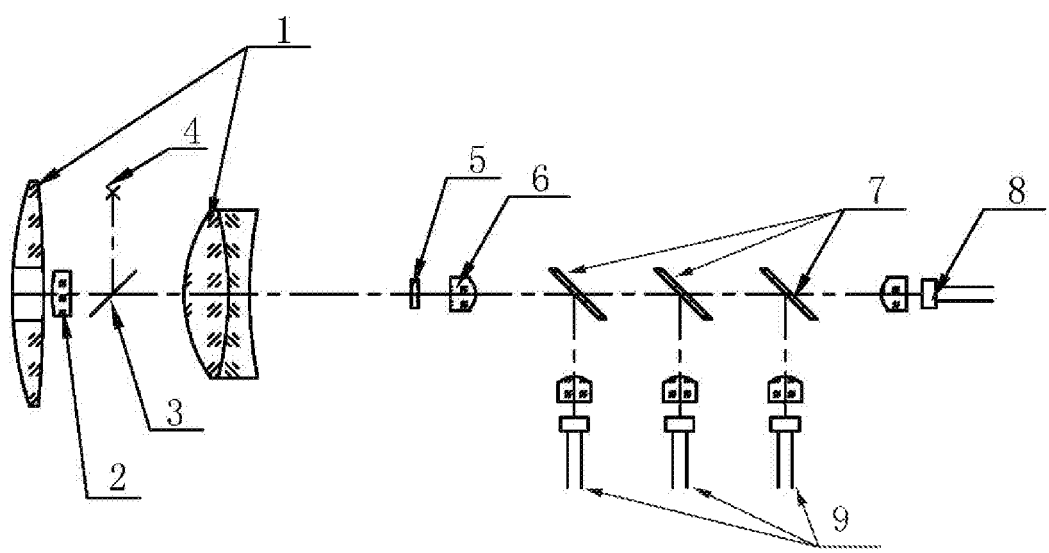
FIG. 1 is a schematic structural view of a laser distance measuring device according to one preferred embodiment of the present invention.

Reference Numerals:
1—receiving lens; 2—emitting lens; 3—reflecting mirror; 4—emitting unit; 5—light filtering unit; 6—condenser lens; 7—spectroscope; 8—receiving unit; 9—spectrum receiving unit.

DETAILED DESCRIPTION

Hereinafter the advantages of the present disclosure will be further described in conjunction with the accompanying drawings and detailed embodiments.

With reference to FIG. 1, it is a schematic structural view of a laser distance measuring device according to one preferred embodiment of the present invention. The laser distance measuring device comprises an emitting unit 4, a reflecting mirror 3, an emitting lens 2, receiving lenses 1, a light filtering unit 5, a condenser lens 6, a spectroscope 7, a receiving unit 8, and a spectrum receiving unit 9.

The emitting unit 4, capable of emitting a light signal in the form of pulse, could be a laser emitter, and it is able to adjust the emissive power to change the energy of the emitted light signal. The reflecting mirror 3 has a total reflection plane, which reflects the light signal emitted by the emitting unit 4 to the emitting lens 2. The light signal runs through the emitting lens 2, and arrives at a measured target which in turn reflects the light signal to form a returning light signal. The returning light signal returns to the position where the laser distance measuring device is located, and passes through the receiving lenses 1. In this embodiment, there are two receiving lenses 1, which match with each other in such a way that the returning light signal is easy to be received, for example, the receiving lenses converge the returning light signal to make the energy thereof more focused. After passing through the receiving lenses 1, the returning light signal passes through the light filtering unit 5 which could be an optical filter for filtering the external stray light not emitted by the laser distance measuring device. After running through the light filtering unit 5, the returning light signal continues to pass through the condenser lens 6, which is a convex lens for converting the received returning light signal into a parallel or approximately parallel reflected light signal. The light filtering unit 5 and the condenser lens 6 are not necessary parts for the implementation of the present invention, and in this embodiment, their application enables the returning light signal to be received better.

In this embodiment, the laser distance measuring device comprises three spectroscopes provided between the condenser lens 6 and the receiving unit 8, which spectroscopes form a light splitting array. The returning light signal, after running through the light splitting array along an optical propagation path, is received by the receiving unit 8, wherein the optical propagation path is a straight line, that is, a light beam can penetrate through all the spectroscopes 7 in the light splitting array without changing the propagation direction. The arrangement direction of the spectroscopes 7 in the light splitting array can be adjusted such that the optical propagation path can also be a polyline, that is, when running through each spectroscope 7, the light beam is refracted in a certain angle and penetrates through it. The spectroscope 7 has the function of splitting light, and the returning light signal running through the spectroscope 7 is split into a penetrating light signal penetrating through the spectroscope 7 and a reflected light signal reflected by the spectroscope 7 according to a light splitting ratio. That is, after receiving the returning light signal, the spectroscope 7 not only allows a part of the received returning light signal to pass through, but also reflects a part of the received returning light signal. In terms of an individual spectroscope 7, the light splitting ratio is the ratio of the energy of the penetrating light signal penetrating through the spectroscope 7 to that of the reflected light signal reflected by the spectroscope 7. In this embodiment, each of the spectroscopes 7 shares the same light splitting ratio, which is 1:4.

In this embodiment, the returning light signal from the condenser lens 6 first passes through the spectroscope 7 nearest to the condenser lens 6 in the light splitting array, and during this process the returning light signal is split by the spectroscope 7 into a penetrating light signal penetrating through the spectroscope 7 and a reflected light signal reflected by the spectroscope 7, wherein the penetrating light signal keeps in the propagation direction of the returning light signal and continues to passes through the next spectroscope 7, thereby being split once again. The same situation takes places for the last spectroscope 7. Overall, the light splitting array, after receiving the returning light signal from the condenser lens 6, generates four groups of light signals totally, wherein three groups of reflected light signals are generated via the reflection of three said spectroscopes 7, while the last group of penetrating light signal are the remaining of the returning light signals resulting from the gradual attenuation thereof after successively penetrating through the three spectroscopes 7. The penetrating light signals penetrating through the spectroscope 7 farthest from the condenser lens 6 in the light splitting array, are finally received by the receiving unit 8. The receiving unit 8 is a photoelectric conversion element, such as an avalanche photodiode (APD), which is used for converting the received light signals into electric signals for subsequent processing.

The laser distance measuring device further comprises three spectrum receiving units 9, which are arranged in a one-to-one correspondence with the spectroscopes 7. Each of the spectrum receiving units 9 is provided on the propagation path of the reflected light signals reflected by the corresponding spectroscope 7, and used for receiving the reflected light signals. The spectrum receiving units 9 are also photoelectric conversion elements.

In this embodiment, the light splitting ratio is 1:4, that is, for a spectroscope 7, 20% of the energy of the received returning light signal penetrates through it, while 80% thereof is reflected. Hence the ratio of the energy received by the receiving unit 8 to that of the reflected light signal received by each of the spectrum receiving units can be calculated. Assuming that the energy of the returning light signal from the condenser lens 6 is 100%, and other forms of energy loss are out of consideration, when the returning light signal runs through the first spectroscope 7, 80% of the energy thereof is received by its corresponding spectrum receiving unit 9 while 20% of the energy thereof penetrates through the spectroscope 7 to reach the second spectroscope 7. The second spectroscope 7 reflects 80% of its received energy, that is, it reflects 16% of the total energy to its corresponding spectrum receiving unit 9, while the remaining 4% of the energy penetrates through the second spectroscope 7 to reach the third spectroscope 7. The percentage of the energy reflected by the third spectroscope 7 is 3.2%, while only 0.8% of the total energy penetrates through the third spectroscope 7, and is received by the receiving unit 8. Therefore, the three spectrum receiving units 9 and the receiving unit 8 constitute a structure with an energy reception ratio gradation. The laser distance measuring device can determine whose measured data among the spectrum receiving units 9 and the receiving unit 8 is employed dependent upon the actual use thereof, so as to obtain the measurement data with greater accuracy in a relatively short measurement time. It would be better that the energy of the received light signals by the spectrum receiving units 9 and the receiving unit 8 is within a certain range, so as to ensure the accuracy of the measurement data. Light signals with either too high or too low energy would affect the accuracy of the measurement data. The distance between the measured target and the laser distance measuring device often varies, and when it is relatively short, the energy of the returning light signals formed by the reflection of the measured target is also relatively intense, therefore the energy of the reflected light signals and the penetrating light signals formed by the returning light signals passing through the light splitting array, is relatively intense. In order to avoid that the spectrum receiving units 9 or the receiving unit 8 assumes to be a saturated state due to the too intense energy of the light signals, the electric signals with relatively low energy converted by the spectrum receiving units 9 and the receiving unit 8 can be selected. On the contrary, when the distance between the measured target and the laser distance measuring device is relatively large, the energy of the reflected light signals and the penetrating light signals formed by the returning light signals passing through the light splitting array, is also relatively low. Preferably, the light signals received by the spectroscope 7 nearest to the condenser lens 6 are employed such that the energy of the returning light signals are employed at utmost, thereby ensuring the accuracy of the measurement data. The implementation way and method for the selection from the spectrum receiving units 9 and the receiving unit 8 of the laser distance measuring device will be described thereinafter.

The laser distance measuring device in this embodiment further comprises an analyzing unit, which is connected with the receiving unit 8 and the spectrum receiving units 9, has an amplitude threshold set therein, and is used for comparing the amplitudes of the electric signals converted by the receiving unit 8 and the spectrum receiving units 9 with the amplitude threshold. The electric signals converted by the receiving unit 8 and the spectrum receiving units 9 are analog quantities with voltage amplitudes, which are subject to the energy intensity of the light signals received by the receiving unit 8 and the spectrum receiving units 9. The larger the energy intensity of the light signals is, the greater the voltage amplitude of the electric signals converted by the receiving unit 8 and the spectrum receiving units 9. The analyzing unit is an electric component, not illustrated in FIG. 1, which can be provided in a housing used specially for integrating electric components of the laser distance measuring device, thereby reducing the interference from the outside. The analyzing unit can includes a plurality of analog-to-digital conversion circuits electrically connected to the receiving unit 8 and the spectrum receiving units 9, for respectively converting the electric signals converted by the receiving unit 8 and the spectrum receiving units 9 to digital quantities, such that a single-chip microcomputer in the analyzing unit collects the digital quantities to conduct calculation and analysis. The analyzing unit could also be a single-chip microcomputer with the function of sampling analog quantities. The electric signals converted by the receiving unit 8 and the spectrum receiving units 9, after voltage modulation, are converted to have a voltage range available for the single-chip microcomputer, then is accessed to the analog quantity input interface of the single-chip microcomputer. The single-chip microcomputer stores an amplitude threshold therein which can be set dependent upon the effect of experiments or actual applications, and it aims to set an effective limit of the amplitudes of the electric signals. When the amplitudes of the electric signals are less than the amplitude threshold, it means that the electric signals are within the effective limit, and can be employed as measurement data. When the amplitudes of the electric signals are greater than or equal to the amplitude threshold, it means that the electric signals are beyond the effective limit, and not applicable to be measurement data.

In other embodiment of the present invention, the light signals could also be optical wavebands such as infrared rays and visible lights. The quantities of the spectroscopes 7 and the spectrum receiving units 9 could be adjusted according to the need of the application. The light splitting ratios of the spectroscopes 7 could also be adjusted according to the need, ranging from 1:1 to 1:10, and they can vary with the spectroscopes 7. The way of light splitting of the spectroscopes 7 can also be mere light penetration and attenuation without reflection, or mere reflection, or the combination of the light refracting penetration and reflection.

Figure 2:
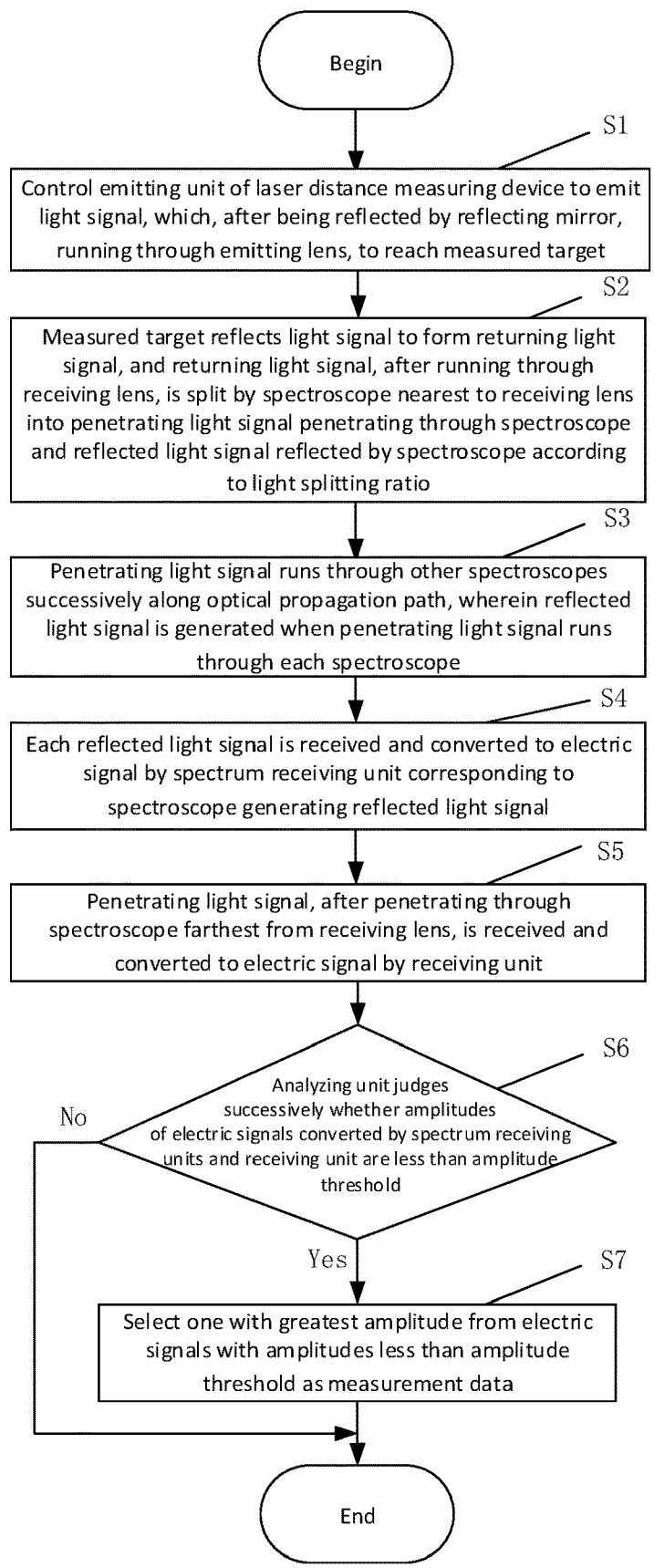
FIG. 2 is a schematic flowchart of a method of use of a laser distance measuring device according to one preferred embodiment of the present invention.

With reference to FIG. 2, it is a schematic flowchart of a method of use of a laser distance measuring device according to one preferred embodiment of the present invention. The method of use is employed for the laser distance measuring device the present invention relates to, and comprises the following steps:

Step S1: an emitting unit 4 of the laser distance measuring device is controlled to emit a light signal, and the light signal, after being reflected by a reflecting mirror 3, runs through an emitting lens 2, to reach a measured target.

In this step the reflection of the light signal is accomplished, wherein the light signal emitted by the emitting unit 4 of the laser distance measuring device could be a pulse signal. The light signal emitted by the emitting unit 4 does not runs directly along the direction toward the measured target, instead, it needs to be reflected by the reflected mirror 3 to run along the direction toward the measured target, then it is adjusted by the emitting lens 2 and reach the measured target.

Step S2: the measured target reflects the light signal to form a returning light signal, and the returning light signal, after running through a receiving lens 1, is split by the spectroscope 7 nearest to the receiving lens 1 into a penetrating light signal penetrating through the spectroscope 7 and a reflected light signal reflected by the spectroscope 7 according to a light splitting ratio.

In this step, the propagation path of the returning light signal is described. The light signal, after being reflected by the measured target, forms a returning light signal, the propagation path of which is directed toward the laser distance measuring device and which, after passing through the receiving lens 1, is split by the spectroscope 7. The returning light signal is split into a penetrating light signal penetrating through the spectroscope 7 and a reflected light signal reflected by the spectroscope 7. The spectroscope 7 splits the light in term of a ratio, which is the ratio of the energy of the light signal penetrating through the spectroscope 7 to that of the light signal reflected by the spectroscope 7. Additionally, in another embodiment of the present invention, a light filtering unit 5 and a condenser lens 6 can be provided between the receiving lens 1 and the spectroscope 7.

Step S3: the penetrating light signal runs through the other spectroscopes 7 successively along the optical propagation path, wherein a reflected light signal is generated when the penetrating light signal runs through each spectroscope.

In this step, the propagation path of the penetrating light signal is described, that is, upon the returning light signal from the receiving lens 1 running through the spectroscope 7 nearest to the receiving lens 1, a penetrating light signal is generated, which keeps in a straight-line propagation path, and continues to pass through the other spectroscopes 7 provided along the propagation path. When the penetrating light signal runs through each spectroscope 7, a reflected light signal and a next penetrating light signal are generated.

Step S4: each reflected light signal is received and converted to an electric signal by a spectrum receiving unit 9 corresponding to the spectroscope 7 generating the reflected light signal.

In this step, the reflected light signal generated by each spectroscope 7 is received by the spectrum receiving unit 9 corresponding to the spectroscope 7. The number of the spectrum receiving units 9 is equal to that of the spectroscopes 7, and the spectrum receiving units 9 have a one-to-one correspondence with the spectroscopes 7, enabling each of the reflected light signals to be received. The spectrum receiving units 9 convert the received light signals into electric signals for subsequent processing.

Step S5: the penetrating light signal, after penetrating through the spectroscope 7 farthest from the receiving lens 1, is received and converted to an electric signal by the receiving unit 8.

In this step, the spectroscope 7 farthest from the receiving lens 1 is the last one which the penetrating light signal penetrates through in the propagation path. At this time, owing to that the penetrating light signal has run through a plurality of the spectroscopes 7, the energy thereof has been attenuated step by step in term of the light splitting ratios. Finally, the penetrating light signal is received by the receiving unit 8.

Step S6: the analyzing unit judges successively whether the amplitudes of the electric signals converted by the spectrum receiving units 9 and the receiving unit 8 are less than an amplitude threshold.

In this step, the analyzing unit judges the amplitudes of the electric signals converted by the spectrum receiving units 9 and the receiving unit 8 and compares them with an amplitude threshold. The objective of this step is to find the electric signal whose amplitude is less than the amplitude threshold.

Step S7: if the amplitude of at least one of the electric signals converted by the spectrum receiving units 9 and the receiving unit 8 is less than the amplitude threshold, the one with the greatest amplitude from the electric signals with the amplitude less than the amplitude threshold is selected as the measurement data.

If the judging condition of the Step S6 is satisfied, that is, there is at least one electric signal with amplitudes less than the amplitude threshold, the step is carried out. In this step, the electric signal with the greatest amplitude in the electric signals satisfying the condition is selected as the measurement data. That is because in the case of satisfying the condition of the amplitude threshold, the greater the amplitude of the electric signal is, the better the readability of the measurement error and value range, which is good for obtaining the most accurate measurement result.

It should be noted that the embodiments of the present invention are of good operability, but not for constituting any limitation to the protection scope thereof. Any person skilled in the art can make alterations or modifications to the embodiments by the aforementioned technical contents, to form an equivalent and effective embodiment. Any amendments, equivalent changes and modifications to the above-mentioned embodiments based on the technical essence of the present invention, without departing from the technical solutions of the present invention, shall belong to the scope defined by the technical solutions of the present invention.

What is claimed is:

1. A laser distance measuring device, the device comprising an emitting unit, wherein the emitting unit is a laser emitter, a reflecting mirror, an emitting lens, a receiving lens, and a receiving unit, wherein the receiving unit is a photo-electric conversion element, and wherein the laser distance measuring device further comprises:
   at least one spectroscope provided between the receiving lens and the receiving unit, which is arranged successively on the same optical propagation path;
   at least one spectrum receiving unit arranged in a one-to-one correspondence with the at least one spectroscope, wherein the at least one spectrum receiving unit is a photoelectric conversion element, which converts received light signals into electric signals, wherein a magnitude of an amplitude of electric signals corresponds to an energy of the received light signals;

wherein the emitting unit emits a light signal, which, after being reflected by the reflecting mirror, is transmitted through the emitting lens, to reach a measured target;

the measured target reflects the light signal to form a returning light signal, which, after running through the receiving lens, is split by the at least one spectroscope nearest to the receiving lens into a penetrating light signal penetrating through the at least one spectroscope and a reflected light signal reflected by the at least one spectroscope according to a light splitting ratio, wherein the light splitting ratio is 1:4;

the penetrating light signal is transmitted through a plurality of other spectroscopes successively along the optical propagation path, wherein a reflected light signal is generated when the penetrating light signal is transmitted through each of the plurality of other spectroscopes;

each reflected light signal is received by a spectrum receiving unit corresponding to the spectroscope generating the reflected light signal; and the penetrating light signal, after penetrating through the spectroscope farthest from the receiving lens, is received by the receiving unit.

2. The laser distance measuring device according to claim 1, wherein
the laser distance measuring device comprises more than two spectroscopes, which constitute a light splitting array;
the optical propagation path through the more than two spectroscopes is a straight line; and
when the returning light signal is transmitted through the light splitting array, an energy of the penetrating light signal penetrating through the two or more spectroscopes is attenuated step by step in terms of the light splitting ratios of the spectroscopes.

3. The laser distance measuring device according to claim 2, wherein
the laser distance measuring device comprises 3-three spectroscopes and 3-three spectrum receiving units; and
the light splitting ratio of each of the three spectroscopes is 1:4.

4. The laser distance measuring device according claim 1, wherein
the receiving unit converts received light signals into electric signals, and wherein a magnitude of an amplitude of electric signals corresponds to an energy of the light signals.

5. A laser distance measuring device, the device comprising an emitting unit, wherein the emitting unit is a laser emitter, a reflecting mirror, an emitting lens, a receiving lens, and a receiving unit, wherein the receiving unit is a photoelectric conversion element, wherein the laser distance measuring device further comprises:
at least one spectroscope provided between the receiving lens and the receiving unit, which is arranged successively on the same optical propagation path;
at least one spectrum receiving unit arranged in a one-to-one correspondence with the at least one spectroscope, wherein the at least one spectrum receiving unit is a photoelectric conversion element, which converts received light signals into electric signals, wherein a magnitude of an amplitude of electric signals corresponds to an energy of the received light signals;

wherein the emitting unit emits a light signal, which, after being reflected by the reflecting mirror, is transmitted through the emitting lens, to reach a measured target;

the measured target reflects the light signal to form a returning light signal, which, after running through the receiving lens, is split by the at least one spectroscope nearest to the receiving lens into a penetrating light signal penetrating through the spectroscope and a reflected light signal reflected by the at least one spectroscope according to a light splitting ratio;

the penetrating light signal is transmitted through a plurality of other spectroscopes successively along the optical propagation path, wherein a reflected light signal is generated when the penetrating light signal is transmitted through each of the plurality of other spectroscopes;

each reflected light signal is received by a spectrum receiving unit corresponding to the spectroscope generating the reflected light signal; and the penetrating light signal, after penetrating through the spectroscope farthest from the receiving lens, is received by the receiving unit,
wherein the laser distance measuring device further comprises an analyzing unit, which is connected with the receiving unit and the at least one spectrum receiving unit, has an amplitude threshold set therein, and is used for comparing the amplitudes of the electric signals converted by the receiving unit and the spectrum receiving units with the amplitude threshold.

6. The laser distance measuring device according to claim 1 wherein
the light signal emitted by the emitting unit is a pulse signal.

7. A method of operating a laser distance measuring device, the method comprising the following steps:
Step S1: controlling an emitting unit of the laser distance measuring device to emit a light signal, which, after being reflected by a reflecting mirror, is transmitted through an emitting lens, to reach a measured target;
Step S2: the measured target reflecting the light signal to form a returning light signal, and the returning light signal, after being transmitted through a receiving lens, being split by a spectroscope nearest to the receiving lens into a penetrating light signal penetrating through the spectroscope and a reflected light signal reflected by the spectroscope according to a light splitting ratio;
Step S3: transmitting the penetrating light signal through a plurality of other spectroscopes successively along an optical propagation path, wherein reflected light signals are generated when the penetrating light signal runs through each of the other spectroscopes;
Step S4: receiving and converting each reflected light signal to an electric signal by a spectrum receiving unit corresponding to the spectroscope generating the reflected light signal;
Step S5: receiving and converting the penetrating light signal, after penetrating through the spectroscope farthest from the receiving lens, to an electric signal by the receiving unit;
Step S6: an analyzing unit judging successively whether amplitudes of the electric signals converted by the spectrum receiving units and the receiving unit are less than an amplitude threshold;

Step S7: if the amplitude of at least one of the electric signals converted by the spectrum receiving units and the receiving unit is less than the amplitude threshold, selecting the electric signal with the greatest amplitude from the electric signals with the amplitudes less than the amplitude threshold as the measurement data.

\* \* \* \* \*